United States Patent
Liu et al.

(10) Patent No.: US 11,625,276 B2
(45) Date of Patent: Apr. 11, 2023

(54) SYSTEM AND METHOD TO UTILIZE HIGH BANDWIDTH MEMORY (HBM)

(71) Applicant: Dell Products L.P., Round Rock, TX (US)

(72) Inventors: Wei Liu, Austin, TX (US); PoYu Cheng, Taipei (TW)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 17/144,903

(22) Filed: Jan. 8, 2021

(65) Prior Publication Data

US 2022/0222115 A1    Jul. 14, 2022

(51) Int. Cl.
*G06F 9/00* (2006.01)
*G06F 9/50* (2006.01)
*G06F 9/4401* (2018.01)

(52) U.S. Cl.
CPC .......... *G06F 9/5016* (2013.01); *G06F 9/4403* (2013.01); *G06F 9/4411* (2013.01); *G06F 9/4401* (2013.01)

(58) Field of Classification Search
CPC ..... G06F 9/5016; G06F 9/4403; G06F 9/4411
USPC ............................................................ 713/2
See application file for complete search history.

(56) References Cited

U.S. PATENT DOCUMENTS

| | | | | |
|---|---|---|---|---|
| 9,098,302 | B2* | 8/2015 | Swanson | G06F 9/4406 |
| 11,003,369 | B1* | 5/2021 | Bernat | G06F 9/4401 |
| 2007/0288687 | A1* | 12/2007 | Panabaker | G06F 13/1615 |
| | | | | 710/22 |
| 2012/0054419 | A1* | 3/2012 | Chen | G06F 12/0246 |
| | | | | 711/E12.008 |
| 2013/0103887 | A1* | 4/2013 | Frey | G06F 11/1441 |
| | | | | 711/E12.001 |
| 2013/0111180 | A1* | 5/2013 | Wong | G06F 12/0246 |
| | | | | 711/173 |
| 2015/0026538 | A1* | 1/2015 | Sakai | G11B 20/1833 |
| | | | | 714/764 |
| 2015/0154125 | A1* | 6/2015 | Ishii | G06F 12/1491 |
| | | | | 714/768 |
| 2019/0012088 | A1* | 1/2019 | Chaluvaiah | G06F 3/0608 |
| 2021/0248049 | A1* | 8/2021 | Olarig | G06F 11/2289 |
| 2021/0373642 | A1* | 12/2021 | Wang | G06F 1/26 |
| 2022/0121750 | A1* | 4/2022 | Lee | G06F 21/572 |

\* cited by examiner

*Primary Examiner* — Volvick Derose
(74) *Attorney, Agent, or Firm* — Chamberlain, Hrdlicka, White, Williams & Aughtry

(57) ABSTRACT

In general, embodiments disclosed herein relate to using high bandwidth memory (HBM) in a booting process. In embodiments disclosed herein, a region of the HBM is set aside as an additional memory pool (also referred to as a pool) for drivers and/or other memory heap requests in the booting process. One or more embodiments maintain the existing memory pool below four GB, but provide an additional resource for drivers and heap requests.

17 Claims, 7 Drawing Sheets

SYSTEM AND METHOD TO UTILIZE HIGH BANDWIDTH MEMORY (HBM)

BACKGROUND

Memory management in a pre-boot environment is a vital component to managing system memory resources for various purposes such as memory pool allocation/freeing, memory page allocation/freeing, heap protection, memory type statistics, Unified Extensible Firmware Interface (UEFI) driver code/data allocation, etc. Pursuant to UEFI standards, a memory management engine only allows continuous memory be allocated and no real paging mechanism is supported. In other words, a virtual and physical address is a one to one mapping, which may lead to memory fragmentation and other allocation issues during booting.

SUMMARY

In general, in one aspect, the invention relates to a method for to discovering system memory, wherein discovering the system memory comprises: detecting High Bandwidth Memory (HBM), and preparing the HBM for booting services, allocating the HBM to the system memory, and utilizing the HBM for booting services.

In general, in one aspect, the invention relates to a computing device comprising a memory management engine comprising instructions, which when executed by a processor, perform a method, the method comprising: discovering system memory, wherein discovering the system memory comprises: detecting High Bandwidth Memory (HBM), and preparing the HBM for booting services, allocating the HBM to the system memory, and utilizing, after the allocating, the HBM for booting services.

In general, in one aspect, the invention relates to a non-transitory computer readable medium comprising computer readable program code, which when executed by a memory management engine of a computer processor enables the computer processor to perform a method for discovering system memory, the method comprising: detecting High Bandwidth Memory (HBM), and preparing the HBM for booting services, allocating the HBM to the system memory, and utilizing, after the allocating, the HBM for booting services.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
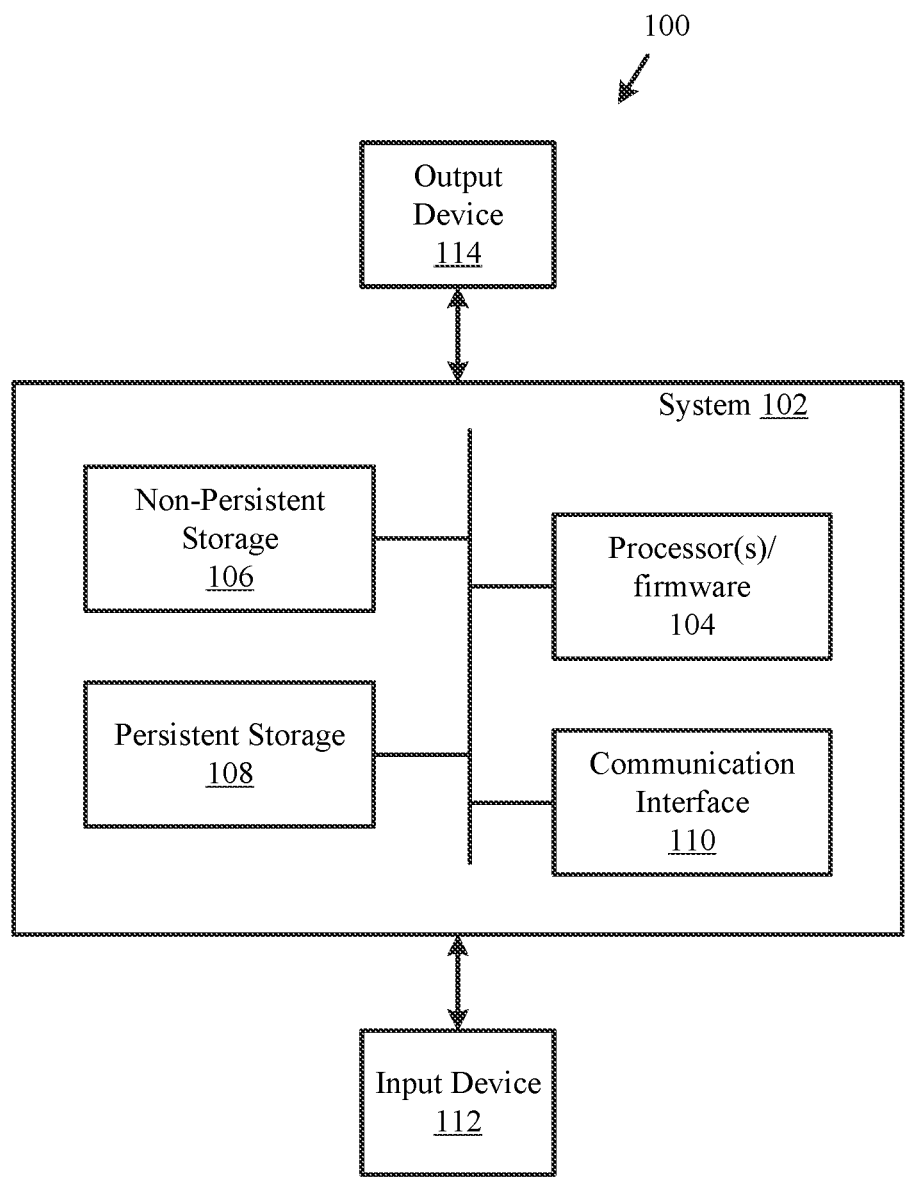
FIG. 1 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named component. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Embodiments disclosed herein include computing devices that include a High Bandwidth Memory (HBM) resource, which is a special memory resource that supports memory bandwidth-intensive workloads of an operating system executing on the computing device. In various implementations, the HBM may be up to four times faster than standard memory. The HBM resource is typically mapped to an address range above four GB.

As previously noted, in the UEFI standards, a memory management engine may only allow continuous memory to be allocated and no real paging mechanism to be applied. Such implementations of the memory management engine are known to suffer from memory fragmentation. Further, such implementations of the memory management engine may lead to other errors, such as a remaining memory chunk being insufficient for a subsequent allocation request.

For example, a large number of UEFI drivers being loaded and unloaded in UEFI Driver Execution Environment (DXE) phase on a computing device may lead to the failure of an insufficient memory chunk for the next allocation request. This type of failure is usually encountered when the requested pool/page is below four GB. In embodiments disclosed herein, a DXE driver is a type of driver that may be combined with Extensible Firmware Interface (EFI) drivers in a given firmware volume. The DXE drivers may be responsible for basic services, processor initialization code, chipset initialization code, and platform initialization code. DXE drivers may produce architectural protocols to facilitate EFI Boot Services and EFI Runtime Services.

The aforementioned fragmentation may result in one or more of the following issues on computing devices: (i) an extremely fragmented UEFI memory map is known to cause the Red Screen of Death (RSOD) in a Windows® boot loader, (ii) errors generated in Linux® loaders that utilize approximately two GB of memory below four GB as RAM disk during initialization, and (iii) failures in updating a Linux® capsule due to lack of available free contiguous memory chunk below four GB.

Another drawback with the implementations of the memory management engine described above is that, as the fragmentation increases, the performance of memory allocation may become slower because more time is needed to search and find a piece of available memory.

Typically, HBM memory is mapped to an address above four GB by the chipset. However, standard EDK2 UEFI implementation only uses memory below four GB for default memory management. Unfortunately, current chipsets (also referred to as processors (see FIG. 1 below)) do not support re-mapping the HBM to memory addresses below four GB. Even if the chipset were re-mapped, much of the memory below the four GB address range is reserved, which would reduce the availability of HBM to the Operating System (OS).

In general, embodiments disclosed herein relate to using HBM in a booting process. In embodiments disclosed herein, a region of the HBM is set aside as an additional memory pool (also referred to as a pool) for drivers and/or other memory heap requests in the booting process. One or more embodiments maintain the existing memory pool below four GB, but provide an additional resource for drivers and heap requests. In one or more embodiments, the drivers loaded into the HBM are DXE drivers. The DXE drivers may be short-lived drivers used in a booting process. The DXE drivers loaded into the HBM may be given a higher priority in the booting process than other drivers.

In one or more embodiments disclosed herein, the HBM may be used for any memory heap requests in the booting process. However, such memory heap requests may not include runtime allocations (for example, for UEFI runtime drives), Advanced Configuration and Power Interface (ACPI) allocations, and/or reserved memory allocations. By excluding such allocations, the aforementioned attributes remain in regular system memory (below four GB). Such exclusion also allows the HBM to be freed upon completion of the boot process.

In one or more embodiments, the memory from HBM is freed to be reclaimed by the OS. Accordingly, after the boot process, the OS may see the entire HBM region as free to use for memory bandwidth-intensive workloads. In one or more embodiments, the HBM is freed upon completion of the booting process, for example, when ExitBootServices( ) is called.

The following describes various exemplary embodiments of the invention. The following description is not intended to limit the scope of the invention.

FIG. 1 shows a diagram of a computing device in accordance with one or more embodiments of the invention. The computing device (100) includes one or more processors (104) (also referred to a chipsets and/or computer processors), non-persistent storage (106) (e.g., HBM and other volatile memory(ies), such as random access memory (RAM), cache memory), persistent storage (108) (e.g., a hard disk, an optical drive such as a compact disk (CD) drive or digital versatile disk (DVD) drive, a flash memory, etc.), a communication interface (110) (e.g., Bluetooth® interface, infrared interface, network interface, optical interface, etc.), input devices (112), output devices (114), and numerous other elements (not shown) and functionalities.

In some embodiments disclosed herein, the computer processor(s) (104) may be an integrated circuit for processing instructions. For example, the computer processor(s) may be one or more cores or micro-cores of a processor. The computing device (100) may also include one or more input devices (112), such as a touchscreen, keyboard, mouse, microphone, touchpad, electronic pen, or any other type of input device. Further, the communication interface (110) may include an integrated circuit for connecting the computing device (100) to a network (not shown) (e.g., a local area network (LAN), a wide area network (WAN) such as the Internet, mobile network, or any other type of network) and/or to another device, such as another computing device.

In some embodiments disclosed herein, the computing device (100) may include one or more output devices (114), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (104), non-persistent storage (106), and persistent storage (108). Many different types of computing devices exist, and the aforementioned input and output device(s) may take other forms.

One or more embodiments of the invention may be implemented using instructions executed by one or more processors of the computing device. Further, such instructions may correspond to computer readable instructions that are stored on one or more non-transitory computer readable mediums.

Figure 2:
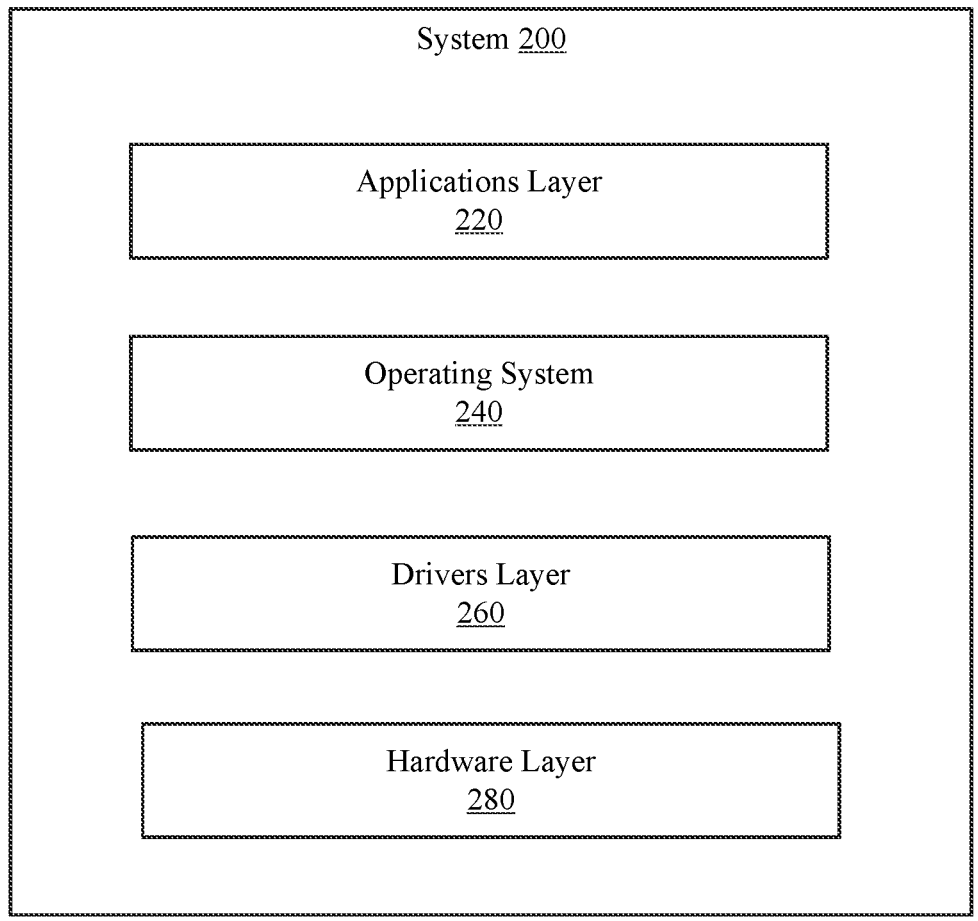
FIG. 2 shows a logical view the computing device in accordance with one or more embodiments disclosed herein.

FIG. 2 shows a logical view of the computing device of FIG. 1 in accordance with one or more embodiments disclosed herein. As shown in FIG. 2, the computing device (200) includes an application layer (220), operating system (240), driver layer (260) and hardware layer (280).

In one or more embodiments, the hardware layer (280) may be responsible for self-tests performed upon powering on the device, chipset initializations, and/or the allocation of resources. The hardware layer (280) may include memory reference code (MRC) or Platform Security Processes (PSP) used to discover system memory (e.g., HBM and other volatile memory) in a booting process. The hardware layer (280) may be embodied by the processors (104), non-persistent storage (106), and persistent storage (108) described in FIG. 1. The hardware layer (280) may include additional components without departing from the invention.

In one or more embodiments, the driver layer (260) may be responsible for loading/processing drivers necessary for the operation of the computing device and, more specifically, to enable the operating system (240) and the applications layer (220) to utilize components in the hardware layer (280). In the embodiments, the driver layer (260) may be responsible for loading/processing the DXE drivers described herein. The driver layer (260) may also be responsible for loading/processing other drivers, for example other UEFI drivers. The driver layer (260) may also be response for facilitating a Boot Devices Selection (BDS) associated with booting connected devices, such as input and output devices, additional disk ("disc" if optical) drives, etc. driver layer One of ordinary skill in the art will understand the functionality of the operating system (240). Embodiments disclosed herein are not limited to any particular operating system. In the embodiments disclosed herein, the operating system may have access to the HBM for memory bandwidth-intensive workloads associated with the operating system (240).

The application layer (220) of the computing device) refers to the applications installed on the operating system (240) in accordance with embodiments disclosed herein. Applications of the application layer (220) may also benefit from the use of the HBM via the operating system (240).

Figure 3:
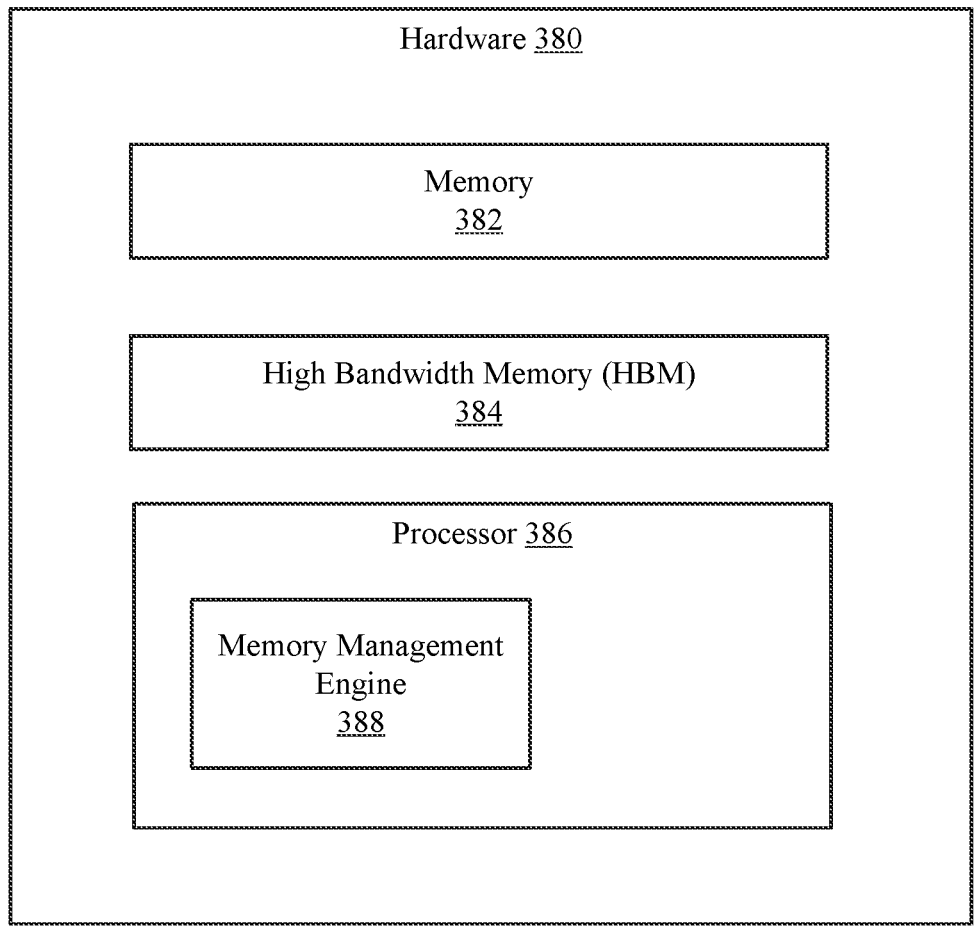
FIG. 3 shows aspects associated with the hardware layer of FIG. 2 in accordance with one or more embodiments disclosed herein.

FIG. 3 shows aspects associated with the hardware layer of FIG. 2 in accordance with one or more embodiments disclosed herein. The hardware layer (380) includes memory (382), HBM (384), and at least one processor (386) in accordance with embodiments disclosed herein. In some embodiments, the processor (386) may include a memory management engine (388). The memory management engine (388) in conjunction with the HBM (384) may be responsible for the methods described in FIGS. 4A and 4B below in accordance with some embodiments herein. In some embodiments, the processor (386) in conjunction with the HBM (384) may be responsible for the methods described in FIGS. 5A and 5B.

In accordance with one or more embodiments disclosed herein, the memory management engine (388) uses a region of the HBM as a high priority allocation space for UEFI DXE drivers. In some embodiments, a region of the HBM may be used as a high priority allocation space for any memory heap request, with some exceptions. Such exceptions may include, but are not limited to, runtime, ACPI and reserved memory allocations in accordance with some embodiments. In some embodiments, any memory allocations that can be cleared from the HBM at the conclusion of the boot process may be permitted. By using the HBM in the boot process, memory usages below four GB are reduced, and memory fragmentation can be avoided.

Figure 4A:
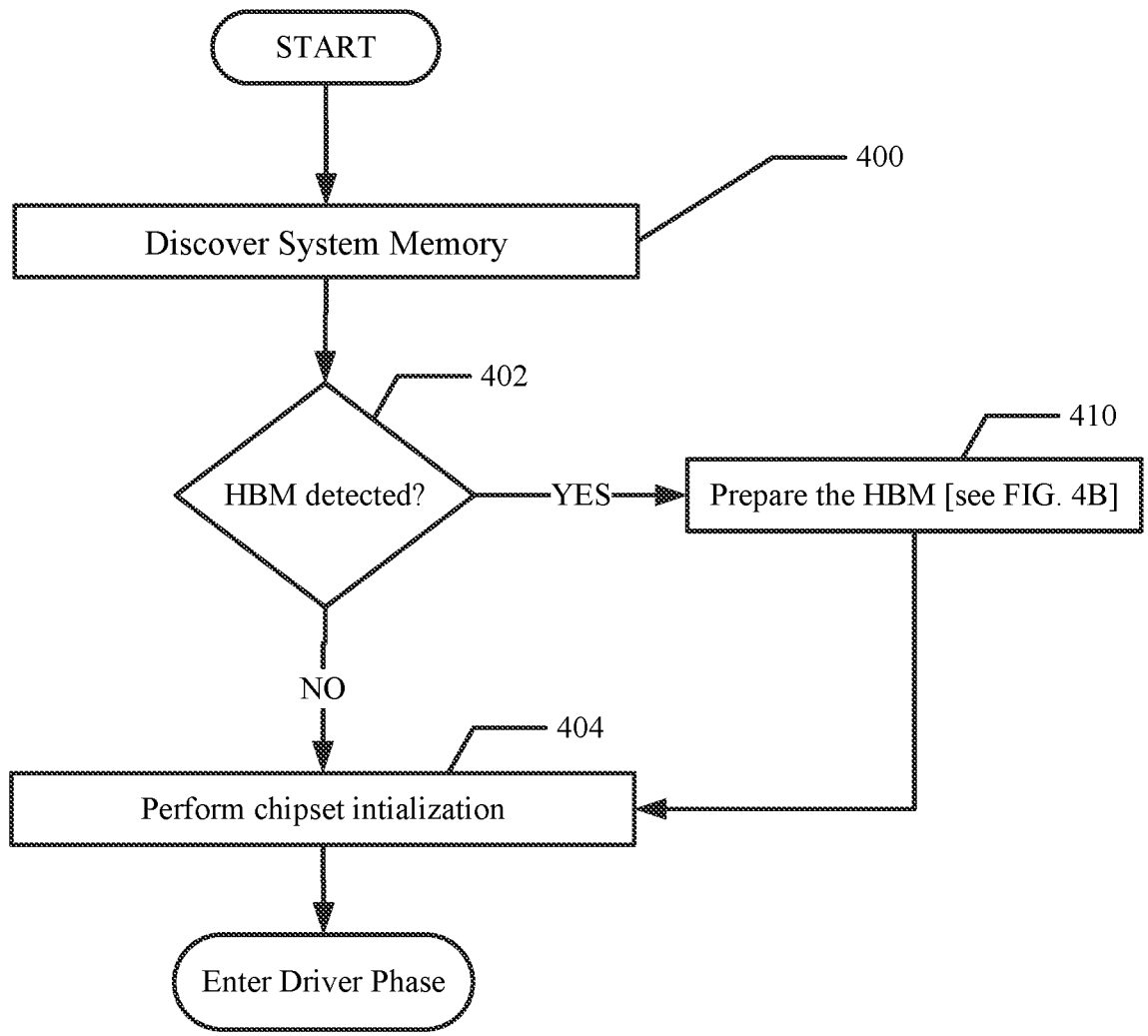
FIG. 4A describes a method in accordance with one or more embodiments herein, and FIG. 4B describes preparing the HBM in accordance with one or more embodiments disclosed herein.

FIG. 4A describes a method in accordance with one or more embodiments herein. Embodiments of FIG. 4A may be performed after powering up and/or performing self-tests associated with powering up.

While the various steps in the flowchart shown in FIG. 4A are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 400, the system memory of the device is discovered. This may include standard processes for discovering system memory as known to those skilled in the art. In step 402, a determination is made about whether the computer devices includes HBM in accordance with embodiments disclosed herein. If HBM is not detected in step 402, the process proceeds to performing the chipset initialization for the booting process in step 404. If HBM is detected in step 402, the HBM is prepared, or initialized, in step 410. Additional detail about the step 410 is provided in FIG. 4B. Continuing the with discussion After the HBM is prepared in step 410, the process proceeds to performing the chipset initialization for the booting process in step 404. After performing the chipset initialization in step 404, the boot process proceeds to a driver phase for installing the appropriate drivers for the computing device.

Figure 4B:
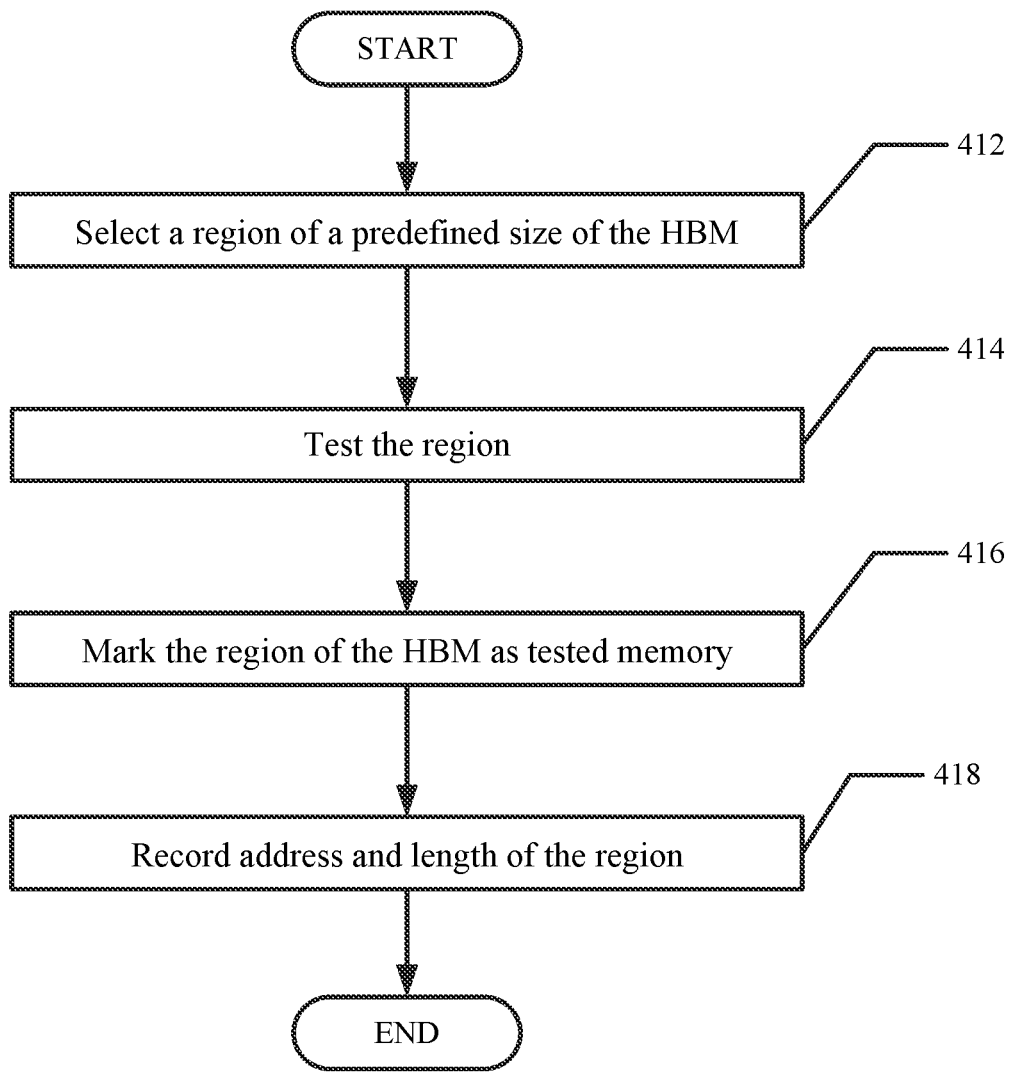

FIG. 4B describes preparing the HBM in accordance with one or more embodiments disclosed herein.

While the various steps in the flowchart shown in FIG. 4B are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 412, a region of a predefined size of the HBM is selected. The size of the region may be any size supported by the HBM without departing from the invention. This region of the HBM may be utilized in the booting process in accordance with embodiments disclosed herein. In step 414, the selected region is tested to ensure viability. In step 416, the region of the HBM is marked as tested memory and, in step 418, the address and length of the region is recorded for future use in the booting process.

Figure 5A:
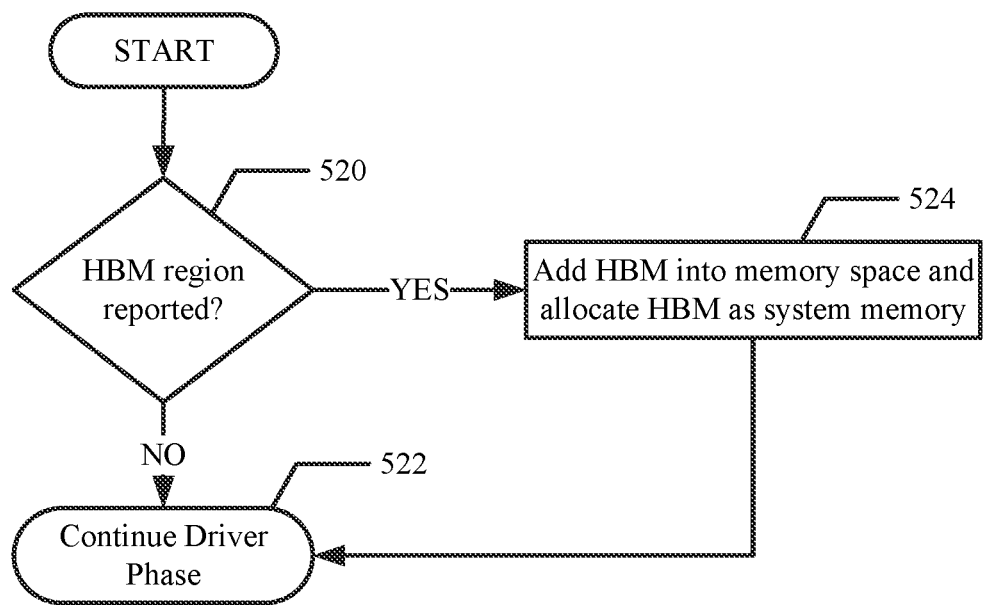
FIG. 5A describes a method in accordance with one or more embodiments disclosed herein, and FIG. 5B describes a method for loading drivers in accordance with one or more embodiments disclosed herein.

FIG. 5A describes a method performed by the computing device upon entering a driver phase of the boot process in accordance with one or more embodiments disclosed herein.

While the various steps in the flowchart shown in FIG. 5A are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

Upon entering a driver phase, in step 520, it is determined whether information on HBM has been recorded. For example, the memory management engine (388) may determine the address and length of the HBM as described in FIG. 4B, and report the results to the processor (386) for the determination in step 520. If it is determined that no HBM region has been prepared, the process continues the driver phase in step 522. If an HBM region has been prepared, the process proceeds to step 524, and the HBM is added into the memory space and allocated as system memory in accordance with embodiments disclosed herein. For example, a memory management engine becomes aware of the HBM memory resource, and the memory engine adds the HBM resource into the Global Coherency Domain (GCD) as system memory.

Figure 5B:
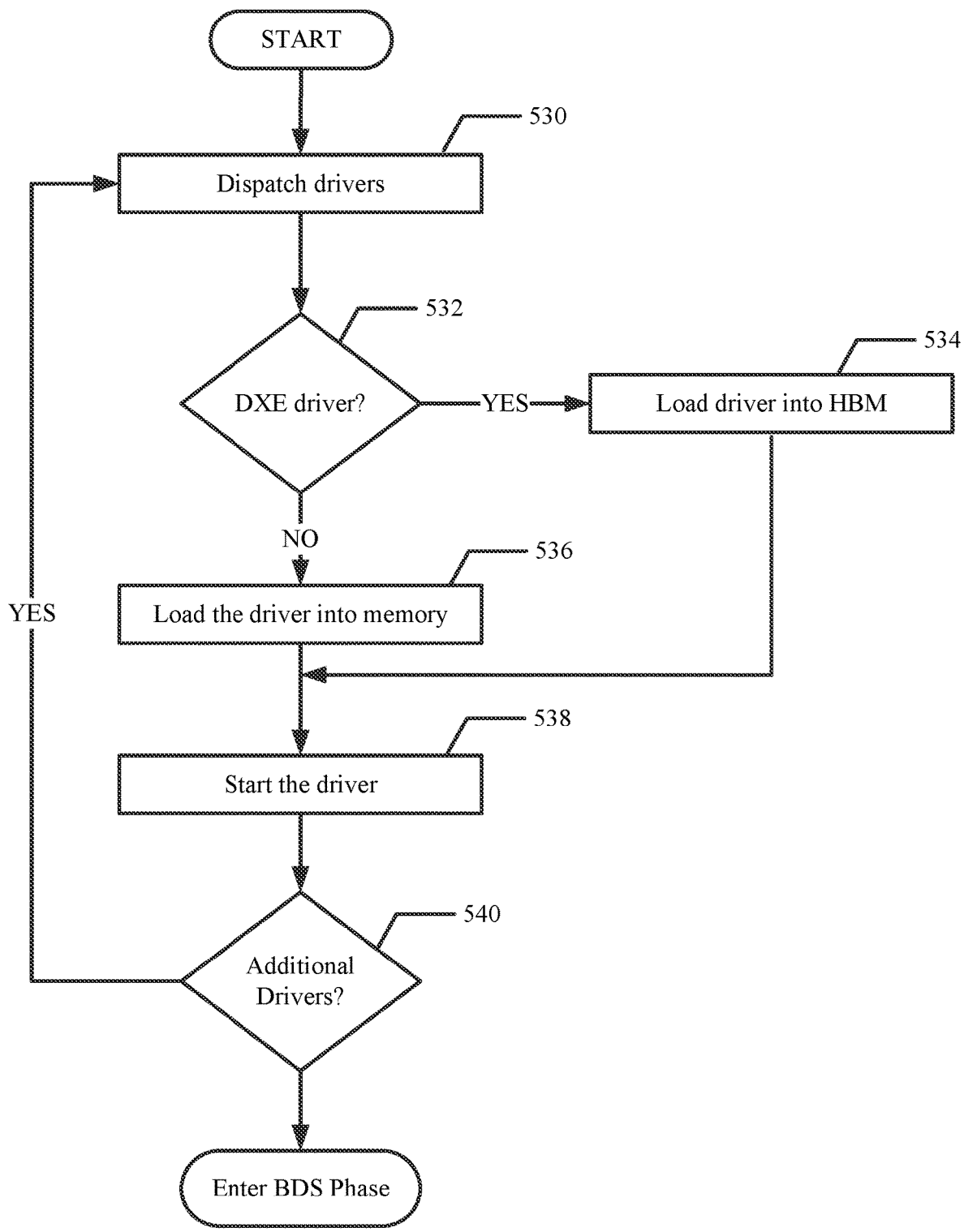

FIG. 5B describes a method for loading drivers in accordance with one or more embodiments disclosed herein. The method shown in FIG. 5B may be performed following the process in FIG. 5A. While the various steps in the flowchart shown in FIG. 5A are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 530, a driver is selected. In one or more embodiments disclosed herein, DXE drivers, which utilize the HBM may be given priority when selecting a driver to load. One of ordinary skill in the art will appreciate that the selected execution order of drivers may include dependencies, for example, some DXE drivers associated with basic services must be loaded prior to more advanced platform-based services. Such dependencies must continue to be respected; however, a higher priority may be given to DXE drivers when possible.

In step 532, it is determined if the selected driver is a DXE driver or driver that may utilize the HBM. If it is determined that the driver can be loaded into the HBM, the driver is loaded into the HBM in step 534. If it is determined that the driver is not appropriate for the HBM, the driver is loaded into the system memory in a traditional fashion in step 536. In step 538, the driver is started using the appropriate HBM or system memory. In step 540, it is determined if additional drivers need to be started and, if so, the process returns to step 530. Otherwise, the process continues in the booting process. For example, the process may enter a BDS phase in a booting process.

In embodiments disclosed herein, DXE drivers are running from the HBM resource. This provides better performance, for example during data encryption/decryption and data compression/decompression, resulting in a much faster boot time.

Embodiments disclosed herein may provide HBM as available memory, using a reported address and size in GCD system memory. In embodiments disclosed herein, the DXE driver is dynamically loaded into HBM, providing the DXE drivers the ability to operate within the faster HBM memory. In one or more embodiments disclosed herein, the frequently invoked Boot Service memory allocation advantageously occurs in the faster HBM resource.

Embodiments disclosed herein may reduce memory fragmentation, particularly below four GB. More specifically, by loading memory allocations, such as DXE drivers, in the HBM, typical memory fragmentation that occurs in system memory below four GB is advantageously avoided in embodiments disclosed herein.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for booting a system, the method comprising:
discovering system memory, wherein discovering the system memory comprises:
detecting High Bandwidth Memory (HBM); and
preparing the HBM for booting services, wherein preparing the HBM for booting services comprises:
selecting a region of a predefined size of the HBM for booting services;
testing the region;
marking the region as tested memory; and
recording, after the marking, an address and length of the region;
allocating the HBM to the system memory; and
utilizing the HBM for booting services.

2. The method of claim 1, wherein utilizing the HBM for booting services comprises:
determining that a driver to be installed is a Driver Execution Environment (DXE) driver;
loading the driver into the HBM of the system memory; and
starting, after the loading, the DXE driver.

3. The method of claim 1, wherein utilizing the HBM for booting services comprises:
using the HBM for a memory heap request in the booting services, wherein the memory heap request excludes runtime memory allocations, Advanced Configuration and Power Interface (ACPI) memory allocations, and reserved memory allocations.

4. The method of claim 1, further comprising:
receiving an indication that boot services have been completed;
freeing the HBM for use by an operating system (OS); and
after the freeing, using the HBM, by the OS, for bandwidth-intensive workloads.

5. The method of claim 4, wherein the indication is calling an ExitBootServices( ) function.

6. The method of claim 1, wherein allocating the HBM to the system memory comprises allocating the HBM to a Global Coherency Domain (GCD) of the system memory.

7. A computing device comprising:
a memory management engine comprising instructions, which when executed by a processor, perform a method, the method comprising:
discovering system memory, wherein discovering the system memory comprises:
detecting High Bandwidth Memory (HBM); and
preparing the HBM for booting services, wherein preparing the HBM for booting services comprises:
selecting a region of a predefined size of the HBM for booting services;
testing the region;
marking the region as tested memory; and
recording, after the marking, an address and length of the region;
allocating the HBM to the system memory; and
utilizing, after the allocating, the HBM for booting services.

8. The device of claim 7, wherein utilizing the HBM for booting services comprises:
determining that a driver to be installed is a Driver Execution Environment (DXE) driver;
loading the driver into the HBM of the system memory; and
starting, after the loading, the DXE driver.

9. The device of claim 7, wherein utilizing the HBM for booting services comprises:
using the HBM for a memory heap request in the booting services, wherein the memory heap request excludes runtime memory allocations, Advanced Configuration and Power Interface (ACPI) memory allocations, and reserved memory allocations.

10. The device of claim 7, further comprising:
receiving an indication that boot services have been completed;
freeing the HBM for use by an operating system (OS); and
using the HBM, by the OS, for bandwidth-intensive workloads.

11. The device of claim 10, wherein the indication is calling an ExitBootServices( ) function.

12. The device of claim 7, wherein allocating the HBM to the system memory comprises allocating the HBM to a Global Coherency Domain (GCD) of the system memory.

13. A non-transitory computer readable medium comprising computer readable program code, which when executed by a memory management engine of a computer processor enables the computer processor to perform a method for discovering system memory, the method comprising:
detecting High Bandwidth Memory (HBM);
preparing the HBM for booting services, wherein preparing the HBM for booting services comprises:
selecting a region of a predefined size of the HBM for booting services;
testing the region;
marking the region as tested memory; and
recording, after the marking, an address and length of the region;
allocating the HBM to the system memory; and
utilizing, after the allocating, the HBM for booting services.

14. The non-transitory computer readable medium of claim 13, wherein utilizing the HBM for booting services comprises:

determining that a driver to be installed is a Driver Execution Environment (DXE) driver;

loading the driver into the HBM of the system memory; and starting the DXE driver.

15. The non-transitory computer readable medium of claim 13, wherein the method further comprises:

receiving an indication that boot services have been completed freeing the HBM for use by an operating system (OS); and using the HBM, by the OS, for bandwidth-intensive workloads.

16. The non-transitory computer readable medium of claim 15, wherein the indication is calling an ExitBootServices( ) function.

17. The non-transitory computer readable medium of claim 13, wherein allocating the HBM to the system memory comprises allocating the HBM to a Global Coherency Domain (GCD) of the system memory.

* * * * *